(12) United States Patent
Tanaka et al.

(10) Patent No.: US 8,088,195 B2
(45) Date of Patent: *Jan. 3, 2012

(54) METHOD FOR MANUFACTURING TITANIUM OXIDE-CONTAINING SLAG

(75) Inventors: Hidetoshi Tanaka, Kobe (JP); Itsuo Miyahara, Kobe (JP); Hiroshi Uemura, Kobe (JP); Takao Harada, Kobe (JP); Hiroshi Sugitatsu, Kobe (JP); Isao Kobayashi, Kobe (JP)

(73) Assignee: Kobe Steel Ltd., Kobe-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/936,549

(22) Filed: Nov. 7, 2007

(65) Prior Publication Data

US 2008/0069763 A1    Mar. 20, 2008

Related U.S. Application Data (63) Continuation of application No. 10/495,577, filed as application No. PCT/JP03/11003 on Aug. 29, 2003, now abandoned.

(30) Foreign Application Priority Data

Oct. 8, 2002 (JP) ................. 2002-294830

(51) Int. Cl.
  *C21B 13/08* (2006.01)
  *C22B 34/12* (2006.01)
(52) U.S. Cl. ............... 75/484; 75/503; 75/504; 423/69; 423/608
(58) Field of Classification Search .............. 75/484, 75/503, 504; 423/69, 608
See application file for complete search history.

(56) References Cited

U.S. PATENT DOCUMENTS

| | | | |
|---|---|---|---|
| 3,218,152 A | 11/1965 | Sasabe | |
| 3,765,868 A | 10/1973 | Moklebust | |
| 3,865,574 A | 2/1975 | Long et al. | |

(Continued)

FOREIGN PATENT DOCUMENTS

CN    1135946 A    11/1996

(Continued)

OTHER PUBLICATIONS

Ian Robinson, "South Africa Expands High Purity Pig Iron", Iron & Steelmaking Raw Materials, Metal Bulletin Monthly, Sep. 1996, pp. 67-71.

(Continued)

*Primary Examiner* — George Wyszomierski
*Assistant Examiner* — Tima M McGuthry Banks
(74) *Attorney, Agent, or Firm* — Oblon, Spivak, McClelland Maier & Neustadt, L.L.P.

(57) ABSTRACT

The present invention provides a method for efficiently manufacturing a titanium oxide-containing slag from a material including titanium oxide and iron oxide, wherein a reduction of titanium dioxide is suppressed and the electric power consumption is minimized. The method includes the steps of: heating a raw material mixture including titanium oxide, iron oxide, and a carbonaceous reductant, or the raw material mixture further including a calcium oxide source, in a reducing furnace; reducing the iron oxide in the mixture to form reduced iron; feeding the resultant mixture to a heating melting furnace; heating the resultant mixture in the heating melting furnace to melt the reduced iron and separate the reduced iron from a titanium oxide-containing slag; and discharging and recovering the titanium oxide-containing slag out of the furnace.

8 Claims, 4 Drawing Sheets

U.S. PATENT DOCUMENTS

| | | | |
|---|---|---|---|
| 4,701,214 A * | 10/1987 | Kaneko et al. | 75/481 |
| 5,997,606 A | 12/1999 | Van Der Colf et al. | |
| 6,015,527 A | 1/2000 | Kamei et al. | |
| 6,063,156 A | 5/2000 | Negami et al. | |
| 6,126,718 A * | 10/2000 | Sawa et al. | 75/485 |
| 6,129,777 A | 10/2000 | Fuji et al. | |
| 6,254,665 B1 | 7/2001 | Matsushita et al. | |
| 6,296,479 B1 | 10/2001 | Nishimura et al. | |
| 6,306,195 B1 * | 10/2001 | Das et al. | 75/10.22 |
| 6,413,295 B2 | 7/2002 | Meissner et al. | |
| 6,419,714 B2 | 7/2002 | Thompson et al. | |
| 6,602,320 B2 | 8/2003 | Fuji et al. | |
| 6,685,761 B1 * | 2/2004 | Hoffman et al. | 75/10.63 |
| 2001/0027701 A1 | 10/2001 | Ito et al. | |
| 2001/0052272 A1 | 12/2001 | Schoukens et al. | |
| 2001/0052273 A1 | 12/2001 | Meissner et al. | |
| 2002/0022208 A1 | 2/2002 | Ozawa et al. | |
| 2002/0033075 A1 | 3/2002 | Kikuchi et al. | |
| 2002/0053307 A1 | 5/2002 | Ishiwata et al. | |
| 2003/0097908 A1 | 5/2003 | Hoffman et al. | |

FOREIGN PATENT DOCUMENTS

| | | |
|---|---|---|
| CN | 1358979 A | 7/2002 |
| CN | 1478908 A | 3/2004 |
| EP | 0 583 126 A1 | 2/1994 |
| GB | 641738 | 8/1950 |
| JP | 1-252712 | 10/1989 |
| JP | 2001-64733 | 3/2001 |
| KR | 2001-0032730 | 4/2001 |
| KR | 2001-71628 | 7/2001 |

OTHER PUBLICATIONS

Alibaba.com "Iron Sand" http://www.alibaba.com/manufacturer/15153493/Sell_Ilmenite_Sand_Titanium_ORE.html printed from website on May 30, 2007.

Techhistory.co.nz "Iron Sand Chemistry" http://www.techhistory.co.nz/lronSands/Titanium.htm, available on web since May 14, 2004 printed from website on May 30, 2007.

Hitachi Metals "Iron Sand" http://www.hitachi-metals.co.jp/e/tatara/nnp020603.htm, printed from website on May 30, 2007.

V.A. Garmata, et al., "Titanium Metallurgy" Metallurgy, 1967, pp. 118-119.

* cited by examiner

PRIOR ART

METHOD FOR MANUFACTURING TITANIUM OXIDE-CONTAINING SLAG

This application is a continuation of U.S. patent application Ser. No. 10/495,577 filed on May 14, 2004 now abandoned, which is a 371 of PCT/JP03/11003 filed on Aug. 29, 2003, the entire contents of which are incorporated herein by reference. This application is based upon and claims the benefit of priority from prior Japanese Patent Application No. 2002-294830, filed Oct. 8, 2002, the entire contents of which are incorporated herein by reference.

TECHNICAL FIELD

The present invention relates to a method for manufacturing a titanium oxide-containing slag, in particular, to a method for efficiently manufacturing a titanium oxide-containing slag by reducing iron oxide, for example, in a crude ore in advance.

BACKGROUND ART

Figure 4:
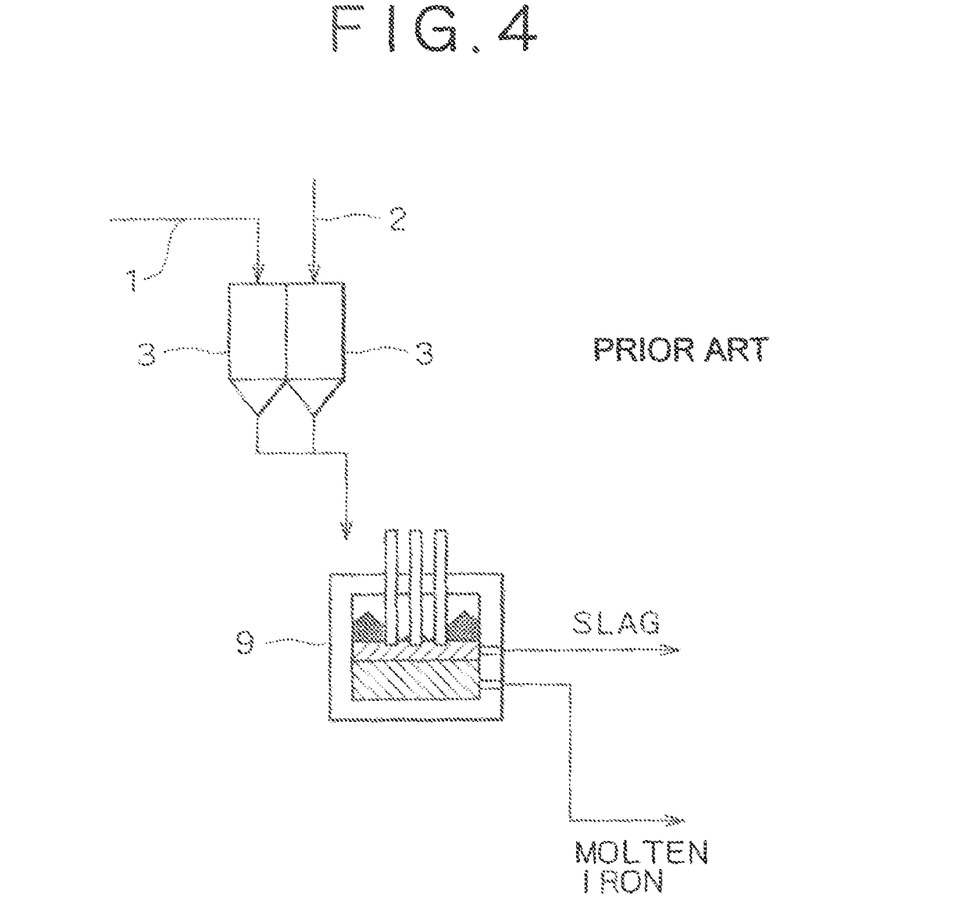
FIG. 4 is a schematic view of an embodiment according to the conventional art.

A method for manufacturing a titanium oxide-containing slag whereby iron is separated from an ore, such as ilmenite, including titanium oxide and iron oxide is known. As exemplified in FIG. 4, ilmenite and a carbonaceous reductant (for example, coke or charred coal) are fed to a submerged arc furnace (hereinafter referred to as SAF) 9 through a feeding line of materials 1 and a feeding line of carbonaceous reductant 2, respectively with controlling each of the feed rates by a regulating unit for feed rate 3. The iron oxide is reduced and melted. Molten iron is then tapped, and titanium oxide-containing slag is tapped from an output port disposed at the furnace wall.

Methods described below are known in the art. In a method, ilmenite is mixed with a carbonaceous reductant such as coke and a small amount of calcium oxide flux, and then the mixture is agglomerated. The resultant mixture is charged in an electric furnace and is heated, thereby separating molten iron and molten titanium oxide-containing slag.

In another method, a required amount of molten iron is stored in a melting furnace, and a carbonaceous material, such as coke, pitch, or heavy oil is added to the molten iron bath, while blowing with oxygen, thereby evaporating the carbonaceous material. Simultaneously, titanium raw material such as magnetite sand or titaniferous iron ore is charged in the iron bath. Metal oxides such as iron oxide and chromium oxide in the titanium raw material are selectively reduced, thereby increasing the content of titanium oxide in a slag and concentrating the titanium oxide.

In the conventional method wherein separation of the iron and the titanium oxide-containing slag is performed by reduction and melting the iron oxide in a raw material using a melting furnace such as the SAF, the temperature in the furnace drops due to the action of the reductive reaction of the iron oxide, which is an endothermic reaction. Thus, a large quantity of electric power is required to keep the furnace temperature constant. Furthermore, a large amount of molten FeO is generated during the process. The molten FeO seriously damages refractories in the furnace; therefore, it is difficult to manufacture the titanium oxide-containing slag efficiently using the SAF. In addition, the furnace has to be kept in a highly reducing atmosphere so as to reduce the iron oxide. Unfortunately, the titanium oxide is also reduced in the reducing atmosphere.

DISCLOSURE OF INVENTION

In view of the above conventional art, it is an object of the present invention to provide a method for manufacturing a titanium oxide-containing slag from a raw material including titanium oxide and iron oxide, wherein the reduction of titanium dioxide can be suppressed, the electric power consumption can be minimized, and the titanium oxide-containing slag can be efficiently manufactured.

In view of the above problems, according to an aspect of the present invention, a method for manufacturing a titanium oxide-containing slag includes the steps of: (A) heating a raw material mixture including titanium oxide, iron oxide, and carbonaceous reductant, or the raw material mixture further including a calcium oxide source in a reducing furnace; (B) reducing the iron oxide in the mixture to form reduced iron; (C) feeding the resultant mixture to a heating melting furnace; (D) heating the resultant mixture in the heating melting furnace to melt the reduced iron and separate the reduced iron from a titanium oxide-containing slag; and (E) discharging and recovering the titanium oxide-containing slag out of the furnace.

According to the method, in the above step (C), the resultant mixture is preferably fed to the heating melting furnace without substantial cooling, i.e., the resultant mixture is not preferably cooled actively. Specifically, the temperature of the reduced mixture preferably does not drop to 350° C. or less, more preferably 650° C. or less, most preferably 900° C. or less.

The reducing furnace is preferably a rotary hearth furnace. Since the rotary hearth furnace readily controls the furnace temperature, the reduction of the titanium dioxide to a low-valence oxide can be suppressed and the iron oxide can be efficiently reduced.

According to another aspect of the present invention, a method for manufacturing a titanium oxide-containing slag includes the steps of: (A) heating a raw material mixture including titanium oxide, iron oxide, and carbonaceous reductant, or the raw material mixture further including a calcium oxide source in a reducing-melting furnace; (B) reducing the iron oxide in the mixture to form reduced iron; (C) further heating the resultant mixture to melt the reduced iron and separate the reduced iron from a titanium oxide-containing slag; and (D) discharging and recovering the titanium oxide-containing slag out of the furnace, wherein the reducing-melting furnace is a moving hearth reducing-melting furnace.

According to the present invention, the moving hearth reducing-melting furnace preferably includes a rotary hearth furnace.

Furthermore, according to the present invention, the furnace preferably has at least two sections in a moving direction of the hearth. One of the sections being upstream of the hearth in the moving direction may be a reduction section and, the other section being downstream of the hearth in the moving direction may be a heating melting section. The temperature of each section is preferably controlled separately.

During the steps, the temperature of the reduction section may be in the range of 1200° C. to 1500° C., the temperature of the heating melting section may be in the range of 1300° C. to 1500° C. Furthermore, the temperature of the heating melting section is preferably 100° C. to 300° C. higher than that of the reduction section.

In terms of handling, the raw material mixture according to the present invention is preferably an agglomerated compact. When the agglomerated compact is used, heat transfer efficiencies in the reducing-melting furnace or the reducing furnace can be enhanced, thereby achieving a high productivity.

REFERENCE NUMERALS 1 feeding line of raw materials (titanium oxide and iron oxide)
2 feeding line of carbonaceous reductant
3 regulating unit for feed rate
4 mixing unit
5 agglomerator
6 rotary hearth furnace (reducing furnace)
7 cooling equipment
8 rotary hearth furnace (reducing-melting furnace)
9 heating melting furnace

BEST MODE FOR CARRYING OUT THE INVENTION

The present inventors have found that the above object could be achieved by a following method, and have accomplished the present invention. Accordingly, in a method for manufacturing a titanium oxide-containing slag (hereinafter referred to as titanium slag) from a raw material mixture including titanium oxide, iron oxide, and carbonaceous reductant, or the raw material mixture further including a calcium oxide source; a moving hearth reducing-melting furnace is used. A method according to the present invention includes the steps of: charging the raw material in a reduction furnace; heating and reducing the iron oxide; charging the resultant mixture in a heating melting furnace; and melting the resultant mixture.

In the conventional art, a raw material mixture is charged in a melting furnace, and the iron oxide is simultaneously reduced and melted. As described above, according to the present invention, the iron oxide in the raw material mixture is sufficiently reduced in advance, and then the resultant mixture is heated and melted. Accordingly, electric power consumption to keep the furnace temperature can be drastically curtailed, and consumption of electrodes can be suppressed. The generation of molten FeO can be also reduced and wear of refractories used for the furnace walls can be considerably suppressed. Furthermore, the problem that titanium dioxide is reduced during the reduction of iron oxide can be solved.

The raw material mixture used in the present invention has a mixture including titanium oxide, iron oxide, and a carbonaceous reductant, or the mixture further including a calcium oxide source. The kinds of titanium oxide and iron oxide are not particularly limited. For example, not only natural ores such as titaniferous iron ore (ilmenite), titaniferous magnetite, and pseudobrookite, but also byproducts during manufacturing process of titanium oxide or titanium can be used. For example, a residue resulting from a separation by a centrifuge, a residue resulting from a filtration by sulphate process, and a separated residue in a chlorination furnace in a manufacturing process of titanium oxide by chloride process are useful. If necessary, these raw materials may be mixed. For example, adding iron ore and steel mill waste may control the amount of iron oxide. Adding, for example, rutile, anatase, and synthetic rutile may control the amount of titanium oxide. Steel mill waste is preferably blast furnace flue dust, which includes carbon and iron oxide, because not only iron oxide but also carbonaceous reductant can be added to the raw materials at the same time. An example of raw material mixture including ilmenite and carbonaceous reductant will now be described. The natural ilmenite may be used. The ratios of titanium and iron are not limited.

Ilmenite generally includes 40 to 60 percent by weight of titanium oxide, and 30 to 50 percent by weight of iron oxide. The content of iron oxide in the raw material mixture is preferably 1/20 or more, more preferably 3/20 or more so as to manufacture the titanium slag efficiently. In that case, the melting energy of the titanium oxide in a melting furnace can be reduced preferably by 10% or more, more preferably by 30% or more.

Natural ilmenite includes gangue, such as any amount of $SiO_2$. Since the gangue, such as $SiO_2$, $Al_2O_3$, Cao, and MgO mixed in the titanium slag degrades the purity of titanium, the content of the gangue in the raw material mixture is preferably small.

The carbonaceous reductant is not limited and any material including carbon may be available. For example, coal, charred coal, coke, oil coke, charcoal, carbide from organic material, and waste plastics may be used. Although the composition of the carbonaceous reductant is not limited, the amount of the carbonaceous reductant is preferably changed so that the iron oxide is sufficiently reduced. For example, the number of moles of the fixed carbon in the raw material mixture is preferably same or more of that of the oxygen combined with the iron oxide. The amount of the carbon may be suitably controlled, because the utilization rate of the carbon depends on the raw material and the carbonaceous reductant. The surplus carbon for the reductive reaction can be used for carburizing the reduced iron and is included in the resultant pig iron. The surplus carbon can be also used for a heat source, with burning in the melting furnace. The carbonaceous reductant may be charged in the furnace as the mixture, or may be disposed on the hearth in advance. Preferably, a sufficient amount of the carbonaceous reductant may be mixed in the mixture with the other raw material. In that case, the vicinity of the iron oxide can be kept in a highly reducing atmosphere during reduction, thereby suppressing reoxidation of the reduced iron.

The method for mixing the raw material mixture is not limited. The above raw materials may be ground and may be mixed with any mixing unit, such as a mixer to prepare the raw material mixture. The resultant mixture may be used as powders. In terms of easy handling, the raw material mixture may be preferably agglomerated to form an agglomerated compact, for example, a briquette, a pellet, and a plate by use of any forming method, such as briquette press, tumbling agglomeration, and extrusion. According to the present invention, a compact formed as a briquette (hereinafter referred to as material compact) will be described as an example.

In manufacturing material compacts, a proper amount of a calcium oxide source, for example slaked lime or limestone, is preferably mixed in the material compacts. In that case, the composition of a component for titanium slag in the material compact, i.e. a component including titanium oxide and slag components such as $SiO_2$, $Al_2O_3$, and $CaO$, which are gangue components in a material ore, and which are ash residues in a carbonaceous material, is controlled. Accordingly, the melting point of the titanium slag, which is formed during melting of the reduced iron, drops and fluidity of the titanium slag increases, thereby readily separating the titanium slag from molten iron. The calcium oxide source may exist during the melting process. For example, calcium oxide may be added to the raw material mixture and then may be agglomerated to form the material compacts. The calcium oxide source may be added to the material compacts and then the compacts may be oxidized. Furthermore, additional calcium oxide source may be charged in the melting process.

If the calcium oxide source is not mixed with the raw material in the melting process, a titanium slag having high purity in titanium is formed, because of low content of the gangue. However, the furnace temperature has to be increased to a high melting point of the slag, for example 1650° C. to 1750° C. Unfortunately, energy consumption increases, refractories are seriously damaged, and consumption of electrodes is increased. Accordingly, the manufacturing cost is increased. Therefore, if necessary, the calcium oxide source may be used depending on a product quality and the manufacturing cost.

In the agglomerating of the material compact, binders, such as bentnite, starch, slaked lime, and organic binder may be used, if necessary.

The reducing-melting furnace and the reducing furnace according to the present invention are preferably a moving hearth reducing-melting furnace and a moving hearth reducing furnace. The moving hearth furnaces are not limited, and any furnace including a movable hearth is useful. All kinds of moving hearth reducing-melting furnaces and moving hearth reducing furnaces, for example, a straight grate furnace and a rotary hearth furnace are useful.

The moving hearth furnace is advantageous in that it can control temperatures easily. In more detail, the moving hearth furnace allows iron oxide to be reduced selectively and time-efficiently, while maintaining a temperature lower than with a conventional melting furnace or reducing furnace, i.e., a temperature low enough to prevent reduction of titanium oxide. In particular, a rotary hearth furnace is preferable in that a space for installing the rotary hearth furnace is relatively small. Furthermore, the rotary hearth furnace can control atmospheres easily. Accordingly, while the reduction of titanium dioxide is suppressed, a high rate of reduction of iron oxide can be achieved.

Although an example wherein a rotary hearth furnace is used for a reducing-melting furnace or a reducing furnace will now be described, the method of the present invention is not limited to a method using the rotary hearth furnace.

In operating the rotary hearth furnace, a rotary hearth is rotated at a predetermined rate, and then material compacts may be fed onto the rotary hearth from a charger such that the material compacts are stacked to have an appropriate thickness. While moving in the furnace, the material compacts charged in the rotary hearth are heated and are reduced with combustion heat and radiation heat by a combustion unit, for example, a combustion burner disposed at the furnace walls. The furnace is kept in a highly reductive atmosphere due to a large amount of CO gas, which is generated by combustion of the carbonaceous reductant in the material compacts by combustion heat and radiation heat. Accordingly, the iron oxide is reduced and the gas in the furnace can be easily controlled. Furthermore, the carbonaceous reductant enhances a reductive potential around the material compacts, then burns in the furnace. Accordingly, the carbonaceous reductant also functions as a fuel, thereby reducing the consumption of a burner fuel, such as natural gas.

When the rotary hearth furnace is used for a reduction furnace, the iron oxide in the material compacts is completely reduced under the reductive atmosphere in the furnace, and then is preferably scraped with a discharger, for example, a scraper or a screw type discharger disposed at a downstream side of the hearth in the moving direction.

As described above, the iron oxide in the material compacts is reduced to form reduced iron, and then the reduced iron is heated and melted. If the iron oxide is not sufficiently reduced, i.e., a large amount of iron oxide remains during the melting process, molten FeO is generated, or the furnace temperature may drop due to an endothermic reaction involved in reduction of the iron oxide (smelting reduction or solid reduction). The endothermic reaction during the melting process causes an increase of the electric power consumption so as to maintain the furnace temperature. The consumption of electrodes is also increased herewith. Furthermore, the molten FeO seriously damages refractories in the furnace. Accordingly, the iron oxide is preferably reduced as much as possible before the melting process. Specifically, if a rate of reduction of iron oxide is less than 30%, the problem due to the endothermic reaction may be occur during heating and melting. However, if the rate of reduction of iron oxide is preferably 60% or more, more preferably 70% or more, most preferably 85% or more, during heating and melting, the decrease of temperature due to the endothermic reaction is suppressed. Accordingly, the furnace can be operated continuously and stably without increasing the electric consumption. Of course, decrease of the total amount of iron oxide results in decreasing the amount of molten FeO, thereby suppressing the damage of the refractories in the furnace as much as possible.

In order to achieve a high rate of reduction of iron oxide, i.e., preferably 60% or more, more preferably 70% or more, most preferably 85% or more, the furnace temperature is preferably kept at a range of 1200° C. to 1500° C., more preferably at a range of 1200° C. to 1400° C. The iron oxide can be selectively and effectively reduced without reducing titanium oxide at the temperature ranging from 1200° C. to 1500° C.

If the reduction temperature is below 1200° C., the reductive reaction of the iron oxide proceeds slowly. Accordingly, the iron oxide has to be held in the furnace for a long time, which decreases the productivity. On the other hand, if the reduction temperature is above 1500° C., titanium dioxide is also reduced; accordingly, the recovery rate of the titanium slag is decreased. In that case, a low melting point slag including FeO is bled out during the reduction process. Since the slag seriously damages the refractories used for the hearth, continuous operation of the furnace is difficult. Although the bleeding phenomenon may occur at the temperature ranging from 1400° C. to 1500° C. in some compositions of the material compacts, the frequency and the possibility are relatively small. Accordingly, the temperature during the reducing process is preferably 1200° C. to 1500° C., more preferably 1200° C. to 1400° C. In the practical operation, the furnace temperature can be set at 1200° C. or less at the early step of the reduction, and then the temperature can be increased in the range of 1200° C. to 1500° C. to proceed with the reduction.

Although the time required for completing the reduction of iron oxide depends on the ratio of iron oxide, titanium oxide, and the kinds of the carbonaceous material, all of which compose the material compacts, the time for the reduction generally ranges from five minutes to twenty minutes.

After the above reduction of the material mixture, a mixture (hereinafter referred to as material for manufacturing titanium slag), wherein titanium oxide is scarcely reduced while most of the iron oxide is reduced, is formed. The shape of material for manufacturing titanium slag does not always have the original shape and includes various types. For example, the shape includes a shape wherein a part of the components, such as a slag, is separated, and a shape wherein a part of reduced iron is separated. The shape depends on, for example, the composition of the material mixture and the reduction condition.

Since the material for manufacturing titanium slag prepared by the reduction of the present invention includes a small amount of iron oxide, the above problems due to iron oxide during melting process are suppressed. Specifically, the electric consumption is curtailed, the consumption of electrodes is suppressed, the damage of the refractories in the furnace is decreased, and the reduction of the titanium dioxide is suppressed. Furthermore, since the melting of the reduced iron is proceeded in a short time, the reduction of titanium dioxide due to a long time process can be avoided, thereby manufacturing a titanium oxide-containing slag efficiently.

As described above, according to the present invention, since iron oxide in the material is sufficiently reduced before the heating and melting process, the resultant reduced iron melts in a relatively short time in the heating and melting process. Accordingly, the reduction of the titanium dioxide can be suppressed.

If most of the carbonaceous reductant mixed in the material compacts is consumed in the reduction process of the iron oxide, the emission of CO gas is decreased in the melting process. In that case, an oxidizing gas reoxidizes the reduced iron. In order to avoid this problem, additional carbonaceous reductant may be charged in the melting process to regulate the atmosphere in the furnace. Keeping the reductive atmosphere in the furnace accelerates the reduction of the remaining iron oxide; furthermore, the melting point of the reduced iron drops due to carburizing to the reduced iron, thereby melting the reduced iron at a relatively low temperature. If the carbon content is not enough, the melting point of the reduced iron does not drop sufficiently. Accordingly, the temperature for heating and melting has to be increased to 1500° C. or more. In a commercial furnace, the operation temperature is preferably as low as possible so as to reduce a thermal load to the refractories of the hearth. Furthermore, in view of the melting point of the generating slag, the operation temperature is preferably about 1500° C. or less.

Accordingly, in order to rapidly melt the reduced iron at a temperature ranging from 1300° C. to 1500° C., the gas composition in the atmosphere is preferably controlled suitably in the melting process.

In the heating and melting process described above, the material for manufacturing titanium slag, which is manufactured in the reduced furnace, may be charged in a heating melting furnace such as an electric furnace, which is used for manufacturing a conventional titanium slag, and then may be carburized and melted. The material compacts may be charged in a moving hearth reducing-melting furnace and reduced in the furnace, and may be heated and melted successively.

In a process wherein the material mixture is heated in the reducing furnace and the iron oxide in the mixture is reduced to form reduced iron and then the resultant mixture is fed to the heating melting furnace, the material for manufacturing titanium slag prepared by the reduction of the iron oxide is preferably fed to the heating melting furnace without substantial cooling.

Even though the material for manufacturing titanium slag discharged from the reducing furnace is cooled to a temperature below the melting point, the temperature of the material is still in the range of about 900° C. to 1300° C. If the material is cooled to room temperature and is fed to the heating melting furnace, the thermal energy is wasted. On the other hand, if the material is kept at the high temperature, and is fed to the heating melting furnace, the loss of the thermal energy is reduced and the method is very practical. The heat is substantially used for a heat source of the melting furnace, thereby reducing the consumption energy for heating the melting furnace. The reducing furnace may be directly linked to the heating melting furnace by a chute. The material may be transferred once to a container covered with refractory, then may be charged to the heating melting furnace. In that case, the "without substantial cooling," intends the mixture is not cooled actively. For example, a secondary cooling such as cooling of an apparatus component, e.g., a chute is not included.

The heating melting furnace includes, for example, an electric furnace and a smelting furnace using fossil fuels. Any melting furnace used for manufacturing the titanium slag is useful.

The heating melting furnace is preferably an arc heating melting furnace, i.e., arc furnace, efficiently heats molten iron by arc heat without forced stirring. Furthermore, using the arc furnace efficiently allows reduction and melting, while suppressing the melting damage of the refractories disposed inside of the furnace. The arc includes a submerged arc generated by electrification by plunging electrodes into a titanium slag, which floats on the molten iron in the melting furnace. A material charger is preferably disposed around an arc heating portion, i.e., insertion portion of the electrodes such that the material for manufacturing titanium slag, which is charged in the arc furnace, is rapidly reduced and melted with arc heat. A charger for additionally charging the carbonaceous reductant may be disposed toward the charging position of the material for manufacturing titanium slag.

In the arc furnace, the charged material for manufacturing titanium-slag is melted and generates molten iron. The molten iron is incorporated one after another to molten iron, which is already generated and retained. Gangue and titanium oxide, both of which coexist in the compacts, form molten titanium slag. The molten titanium slag flows together with the molten slag floating on the molten metal. Accordingly, at a time that the molten iron and the molten titanium slag are stored at a predetermined amount in the arc furnace, the molten iron may be discharged one after another from a lower position of the melting furnace, and the molten titanium slag may be suitably discharged from a position a little above the boundary face between the molten titanium slag and the molten iron. The molten titanium slag and/or molten iron may be discharged by tilting the furnace.

The molten titanium slag is cooled. Then the titanium slag may be used as it is. Furthermore, the titanium slag may be crushed, and then titanium oxide may be separated from other slag components by screening. The resultant molten iron metal may be used as a material for iron manufacture.

The reduction process and the melting process can be also performed as a continuous process with a moving hearth furnace, for example, a rotary hearth furnace. After the reduction process in the rotary hearth furnace, the furnace temperature is increased in the range of 1300° C. to 1500° C. to perform the melting process. In the above two-step heating process, remaining iron oxide is reduced and the reduced iron is melted. In that case, both reduced iron and titanium oxide are manufactured stably and efficiently. In the two-step heating process the rotary hearth furnace is, for example, preferably separated to at least two sections in the moving direction of the hearth by partition walls. One section being disposed upstream is a reduction section; the other section being disposed downstream is a heating melting section. The temperature of each section and the gas composition in the atmosphere of each section are preferably separately controlled.

The furnace may be separated to four sections or more, by three partition walls or more, thereby controlling the temperature and gas composition in the atmosphere precisely. Any number of sections is possible depending on the scale and the structure of a moving hearth reducing-melting furnace. Furthermore, cooling equipment including any cooling unit can be installed to cool and solidify the molten iron. Accordingly, the resultant material is readily scraped by a discharger disposed at the downstream portion. In this case, although a generated slag is also discharged as a titanium slag, the slag may be separated by any separating unit such as crushing and screening.

In order to perform the reduction and melting more smoothly and more efficiently, the temperature in the furnace during the melting is preferably 100° C. to 300° C., more preferably 120° C. to 250° C. higher than that during the reduction.

In using the reducing-melting furnace, the titanium slag may not be melted. When the discharged products are recovered as a mixture including iron granules and slag granules, the mixture is crushed after discharging from the furnace and is sorted out by any method such as magnetic separation, thereby manufacturing a slag including a large amount of titanium.

The method for manufacturing a titanium oxide-containing slag according to the present invention is also applied to a vanadium oxide-containing slag and a niobium oxide-containing slag. The material containing vanadium oxide includes a magnetite containing titanium and vanadium, a dust by a boiler operation, and a waste catalyst. For example, a mixture including a material, which contains vanadium oxide and iron oxide, and a carbonaceous reductant is charged in the reducing furnace to reduce the iron oxide. Then the resultant mixture is melted in the melting furnace. Vanadium oxide-containing slag is manufactured by the above method. The material containing niobium oxide includes niobium ores such as pyrochlore and columbite. For example, a mixture including a material, which contains niobium oxide and iron oxide, and a carbonaceous reductant is charged in the reducing furnace to reduce the iron oxide. Then the resultant mixture is melted in the melting furnace. Niobium oxide-containing slag is manufactured by the above method. Of course, the reducing-melting furnace is useful for performing the reduction and the melting.

EXAMPLE 1

Figure 1:
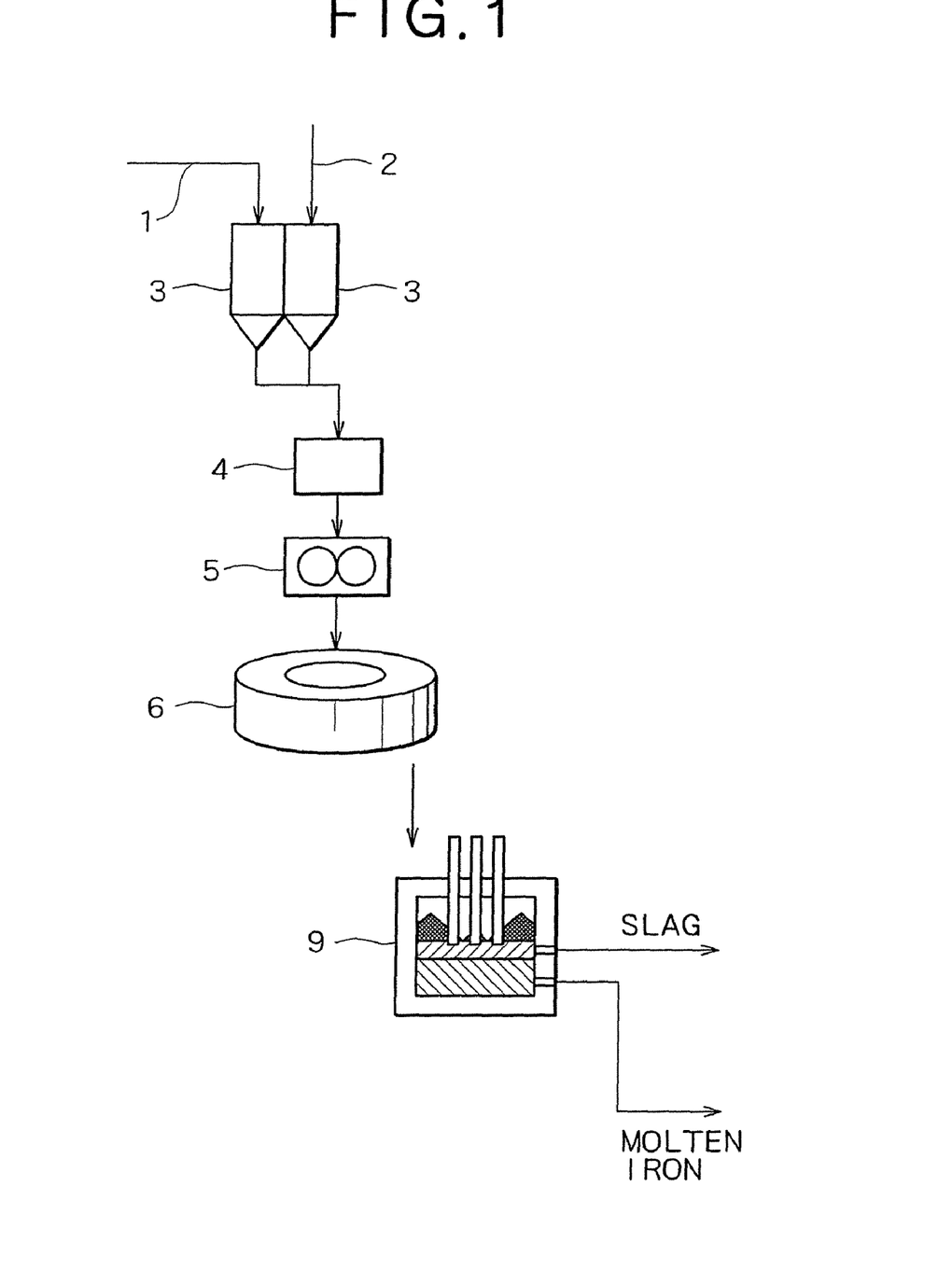
FIG. 1 is a schematic view of an example according to an embodiment of the present invention.

Referring to FIG. 1, crushed carbonaceous reductant (coal, fixed carbon: 74.0%, volatile matter: 15.5%, ash: 10.5%) and ilmenite ($TiO_2$: 44.4%, total Fe: 31.3% (FeO: 36.7%), $SiO_2$ and others: rest) were fed to regulating unit for feed rate 3 through a feeding line of carbonaceous reductant 2 and a feeding line of raw materials 1, respectively and were mixed with a mixing unit 4 (mixer) (mixing ratio: coal 10.2 parts by weight, ilmenite 89.8 parts by weight). Molasses (about 3%) was added as a binder and slaked lime (about 1%) was further added as a calcium oxide source and a binder. The mixture was pressed by an agglomerator 5 (briquette press) to form briquette compacts (volume: 5.5 cm$^3$)/then the compacts were charged into a rotary hearth furnace 6. The furnace was heated by burners disposed at the furnace wall so that the temperature therein ranges from 1200° C. to 1500° C. The compacts were held in the furnace from 5 minutes to 12 minutes on average, thereby heating and reducing iron oxide. The conditions for heating and reducing were controlled such that about 85% of the iron oxide was reduced to iron. The composition of the material for manufacturing titanium slag was as follows: $TiO_2$: 46.03%, FeO: 6.34%, total Fe: 32.45%, and others: rest. The shape of the discharged material for manufacturing titanium slag was briquette shape.

EXAMPLE 2

Referring to FIG. 1, the material for manufacturing titanium slag charged from the rotary hearth furnace according to Example 1, was continuously fed to a heating melting furnace 9, i.e., an arc heating melting furnace disposed adjacent to the rotary hearth furnace, so that the material does not contact the air as much as possible, maintaining a high temperature (900° C.). Then the material was heated and melted. In the heating and melting process, a fixed amount of molten iron was kept in the melting furnace, and a submerged arc method was employed. Specifically, electrodes for arc heating were plunged into the molten slag layer then were electrically charged. The material for manufacturing titanium slag was charged toward the vicinity of the arc heating portion, and then melted by arc heating. According to the present embodiment, since the material for manufacturing titanium slag discharged from the reducing furnace included necessary carbon and calcium oxide, additional carbonaceous reductant and flux were not required. When a predetermined amount of molten iron was produced in the furnace, the molten iron was discharged from a tapping hole to a ladle, and molten titanium slag was suitably discharged from a slag outlet disposed at a sidewall of the furnace, thereby controlling the molten titanium slag remaining in the furnace. A resultant molten pig iron included 4.0% carbon. The resultant titanium slag included 70.0% $TiO_2$. According to this Example, an electric power consumption in the arc heating electrodes was about 1340 KWh/tmi (mi: molten iron for manufacturing).

EXAMPLE 3

Figure 2:
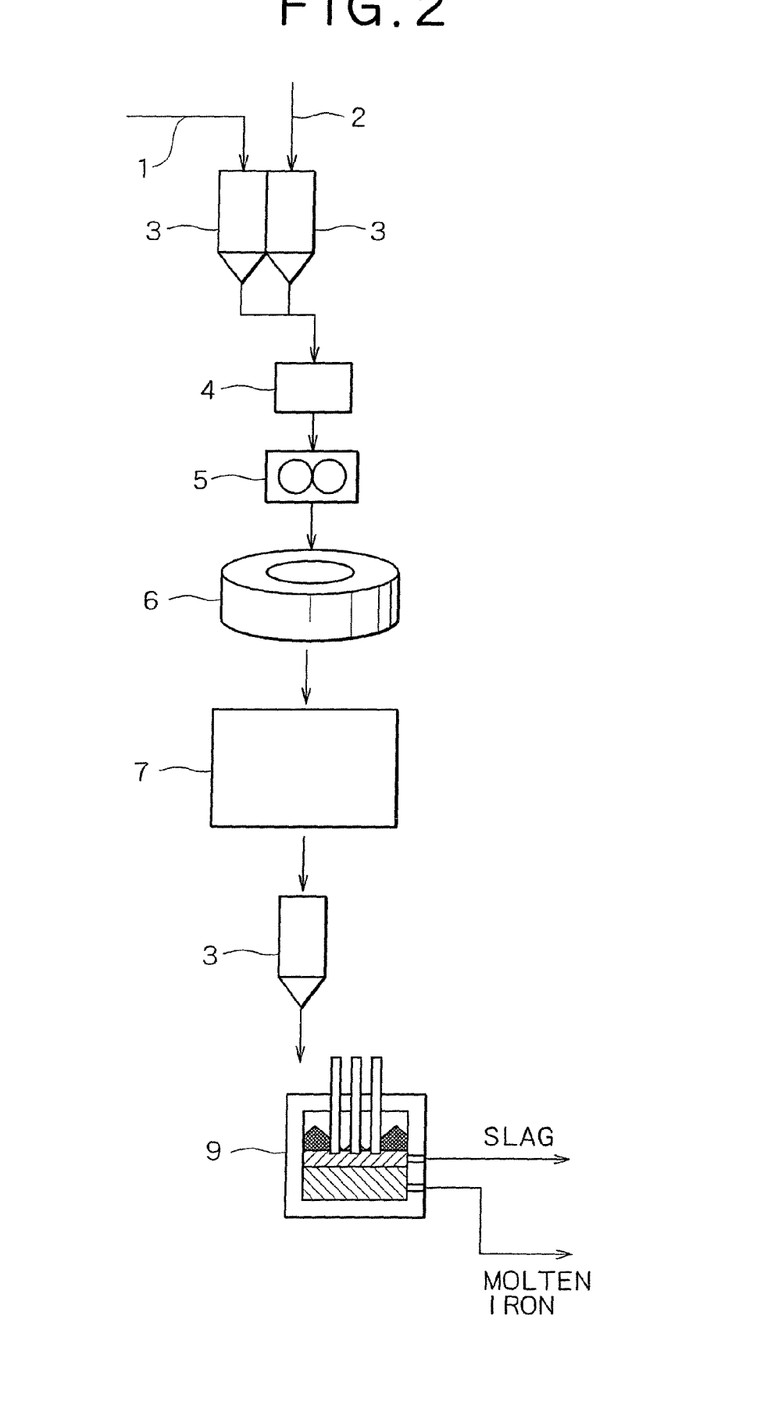
FIG. 2 is a schematic view of another example according to an embodiment of the present invention.

The material for manufacturing titanium slag according to Example 1 was melted in the arc heating melting furnace 9 using the same condition in Example 2, except in that the resultant material was stood to cooling to a room temperature in cooling equipment 7 shown in FIG. 2. Then molten titanium slag and molten iron were manufactured.

The composition of the molten iron and the composition of the titanium slag were the same as in Example 2. According to this Example, however, the electric power consumption in the arc heating electrodes was about 2020 KWh/tmi (mi: molten iron for manufacturing).

COMPARATIVE EXAMPLE 1

The briquette compacts used in Example 1 were charged into the heating melting furnace 9 used in Example 2, instead of being charged into the rotary hearth furnace. That is, the iron oxide in the compacts was not reduced in advance. Then molten titanium slag and molten iron were manufactured from the compacts, using the same conditions in Example 2. A resultant molten pig iron included 4.0% carbon. The resultant titanium slag included 69.0% $TiO_2$. A part of the refractories used for the furnace walls was damaged. According to this Comparative Example, the electric power consumption in the arc heating electrodes was about 3430 KWh/tmi (mi: molten iron for manufacturing).

EXAMPLE 4

Figure 3:
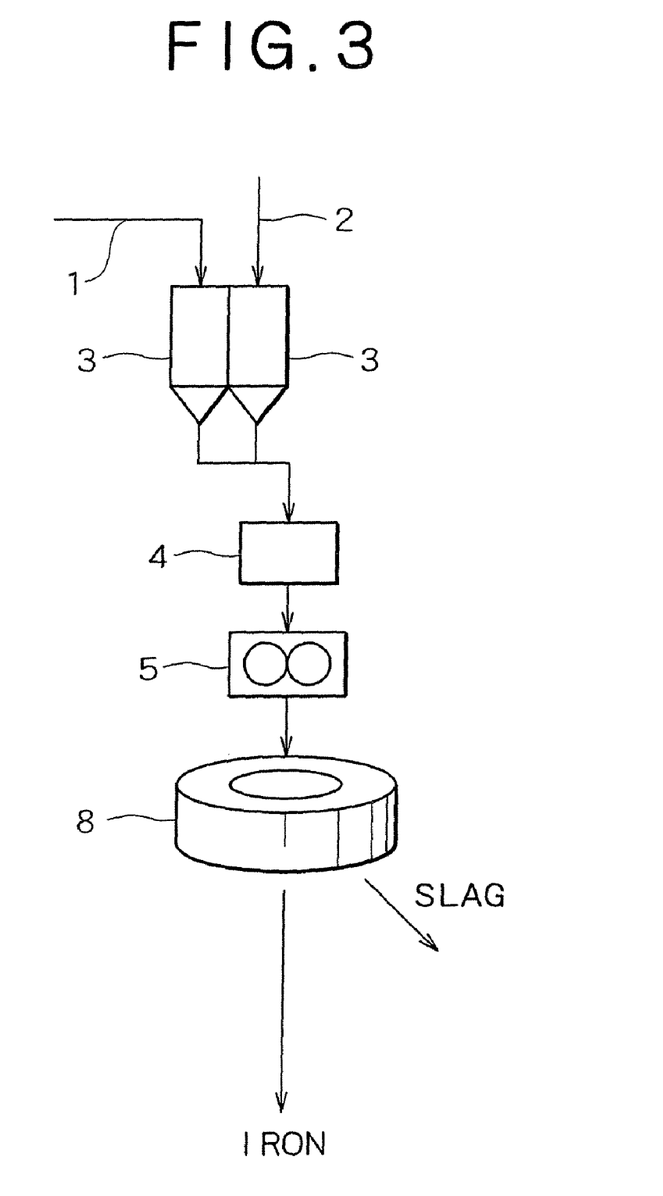
FIG. 3 is a schematic view of another example according to an embodiment of the present invention.

Referring to FIG. 3, the briquette compacts used in Example 1 were reduced in the rotary hearth furnace 8 and then melted in the same furnace. The rotary hearth furnace 8 includes two sections, i.e., a reduction section and a heating melting section separated by a partition wall. Iron oxide was reduced in the reduction section using the same conditions in Example 1, and then the resultant material was melted in the heating melting section at a temperature in the furnace ranging from 1300° C. to 1500° C. The resultant molten iron and titanium slag were cooled to about 1000° C. to solidify, then were discharged out of the furnace by a discharger. The process from charging to discharging the material required about 8 minutes to 15 minutes. The resultant reduced iron was a high-grade iron, which included about 96% iron. The resultant titanium slag also included high content of titanium ($TiO_2$: 70%).

EXAMPLE 5

In this Example, the material including titanium oxide and iron oxide was a residue resulting from a centrifugal separation process during titanium oxide manufacturing by a sulphate process. The main composition of the residue was as follows: Total Fe: 15% to 20%, $H_2SO_4$: 10% to 15%, Mg: 1% to 2%, $TiO_2$: 4% to 7%, and others: rest. The residue was roasted to remove moisture and volatile components. The iron and magnesium were oxidized in the roasted residue. The roasted residue and a carbonaceous reductant, i.e., coal were mixed (mixing ratio: residue 80 parts by weight, coal 20 parts by weight). The mixture was pressed by an agglomerator to form briquette compacts. Slaked lime (0.6 parts by weight) was added to the compacts such that basicity was 1.1, i.e., $CaO/SiO_2$=1.1, thereby preparing the material compacts (100.6 parts by weight). The material compacts were fed into the rotary hearth furnace having a hearth moving at a constant speed, such that the material compacts were stacked to have a uniform thickness. The iron oxide in the material was reduced at a furnace temperature ranging from 1200° C. to 1500° C. Then the resultant material was discharged from the furnace. The material for manufacturing titanium slag was prepared (65 parts by weight). The composition of the material for manufacturing titanium slag was as follows: Total Fe: 70%, C: 6%, $TiO_2$: 10%, MgO: 4%, CaO: 1%, $SiO_2$: 1%, and $Al_2O_3$: 1%. The material for manufacturing titanium slag (65 parts by weight) was melted with the arc heating melting furnace 9 as in Example 2.

After the melting process, molten pig iron (45 parts by weight) and titanium slag (13 parts by weight) were discharged from the melting furnace. The molten pig iron included 96% iron. The titanium slag included 51% titanium oxide.

INDUSTRIAL APPLICABILITY

As described above, according to the present invention, iron oxide can be reduced in a short time. Accordingly, while the reduction of titanium dioxide is suppressed, a high rate of reduction of iron oxide can be achieved. The material for manufacturing titanium slag described above includes low content of iron oxide. Accordingly, the drop in furnace temperature due to the reductive reaction of iron oxide can be suppressed; therefore, electric power consumption to keep the furnace temperature can be curtailed. The generation of molten FeO can be also reduced, thereby suppressing the damage of refractories in the furnace. Unlike a conventional process, since a highly reductive atmosphere in the furnace is not required, the reduction of the titanium oxide can be suppressed. Furthermore, when the material for manufacturing titanium slag according to the present invention is heated, the material starts melting within a short time. Accordingly, reduction of the titanium oxide due to a long time process can be avoided, thereby manufacturing a titanium oxide-containing slag efficiently.

According to the method of the present invention, the titanium slag is efficiently manufactured from a material such as ilmenite, including titanium oxide and iron oxide.

The invention claimed is:

1. A method for manufacturing a titanium oxide-containing slag, comprising the steps of:
   (A) heating a raw material mixture including at least 40% titanium oxide, iron oxide, and carbonaceous reductant in a reducing-melting furnace to a reducing temperature that does not exceed 1400° C.;
   (B) reducing the iron oxide in the mixture to form reduced iron;
   (C) further heating the resultant mixture to melt the reduced iron and separate the reduced iron from a titanium oxide-containing slag formed upon melting the reduced iron in the reducing-melting furnace;
   (D) discharging the titanium oxide-containing slag out of the furnace, wherein the reducing-melting furnace is a moving hearth reducing-melting furnace; and
   (E) recovering the separated and discharged titanium oxide-containing slag, wherein the reducing-melting furnace has at least two sections in a moving direction of the hearth, one of the sections being upstream of the hearth in the moving direction is a reduction section, the other section being downstream of the hearth in the moving direction is a heating melting section, and the temperature of each section is separately controlled,
   wherein the temperature of the reduction section is in the range of 1200° C. to 1500° C., the temperature of the heating melting section is in the range of 1300° C. to 1500° C., and the temperature of the heating melting section is 100° C. to 300° C. higher than that of the reduction section.

2. The method according to claim 1, wherein the moving hearth reducing-melting furnace is a rotary hearth furnace.

3. The method according to claim 1, wherein the raw material mixture is an agglomerated compact.

4. The method according to claim 1, wherein the raw material mixture further comprises a calcium oxide source.

5. A method for manufacturing a titanium oxide-containing slag, comprising the steps of:
   (A) heating a raw material mixture including titanium oxide, iron oxide, and carbonaceous reductant in a reducing-melting furnace to a reducing temperature;
   (B) reducing the iron oxide in the mixture to form reduced iron until the rate of reduction of iron oxide is 60% or more;
   (C) further heating the resultant mixture having a rate of reduction of iron oxide that is 60% or more to melt the reduced iron and separate the reduced iron from a titanium oxide-containing slag formed upon melting the reduced iron in the reducing-melting furnace;
   (D) discharging the titanium oxide-containing slag out of the furnace, wherein the reducing-melting furnace is a moving hearth reducing-melting furnace; and
   (E) recovering the separated and discharged titanium oxide-containing slag, wherein the reducing-melting furnace has at least two sections in a moving direction of the hearth, one of the sections being upstream of the hearth in the moving direction is a reduction section, the other section being downstream of the hearth in the moving direction is a heating melting section, and the temperature of each section is separately controlled, wherein the temperature of the reduction section is in the range of 1200° C. to 1500° C., the temperature of the heating melting section is in the range of 1300° C. to 1500° C., and the temperature of the heating melting section is 100° C. to 300° C. higher than that of the reduction section.

6. The method according to claim 5, wherein the moving hearth reducing-melting furnace is a rotary hearth furnace.

7. The method according to claim 5, wherein the raw material mixture is an agglomerated compact.

8. The method according to claim 5, wherein the raw material mixture further comprises a calcium oxide source.

* * * * *